Figure 5:
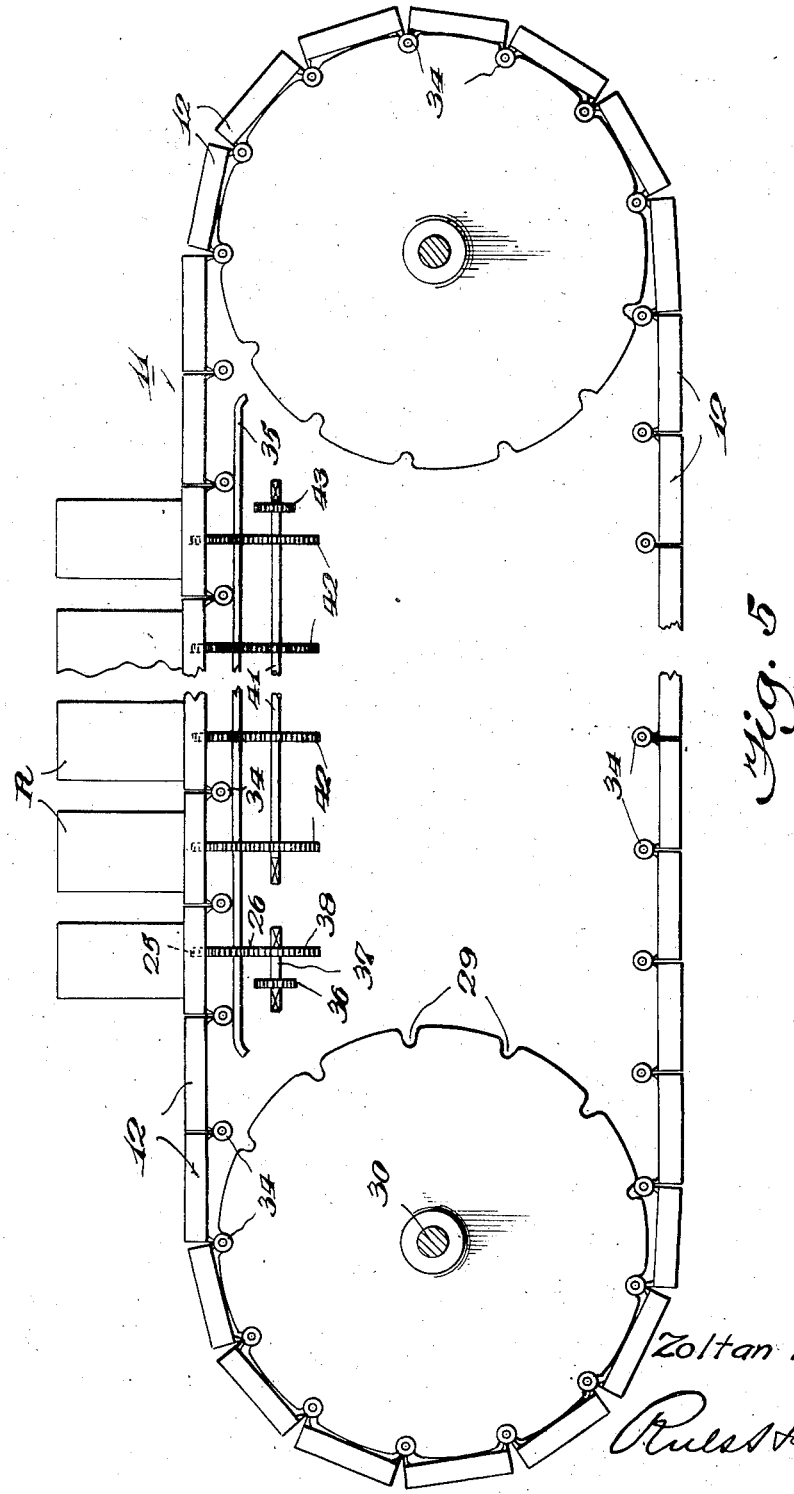

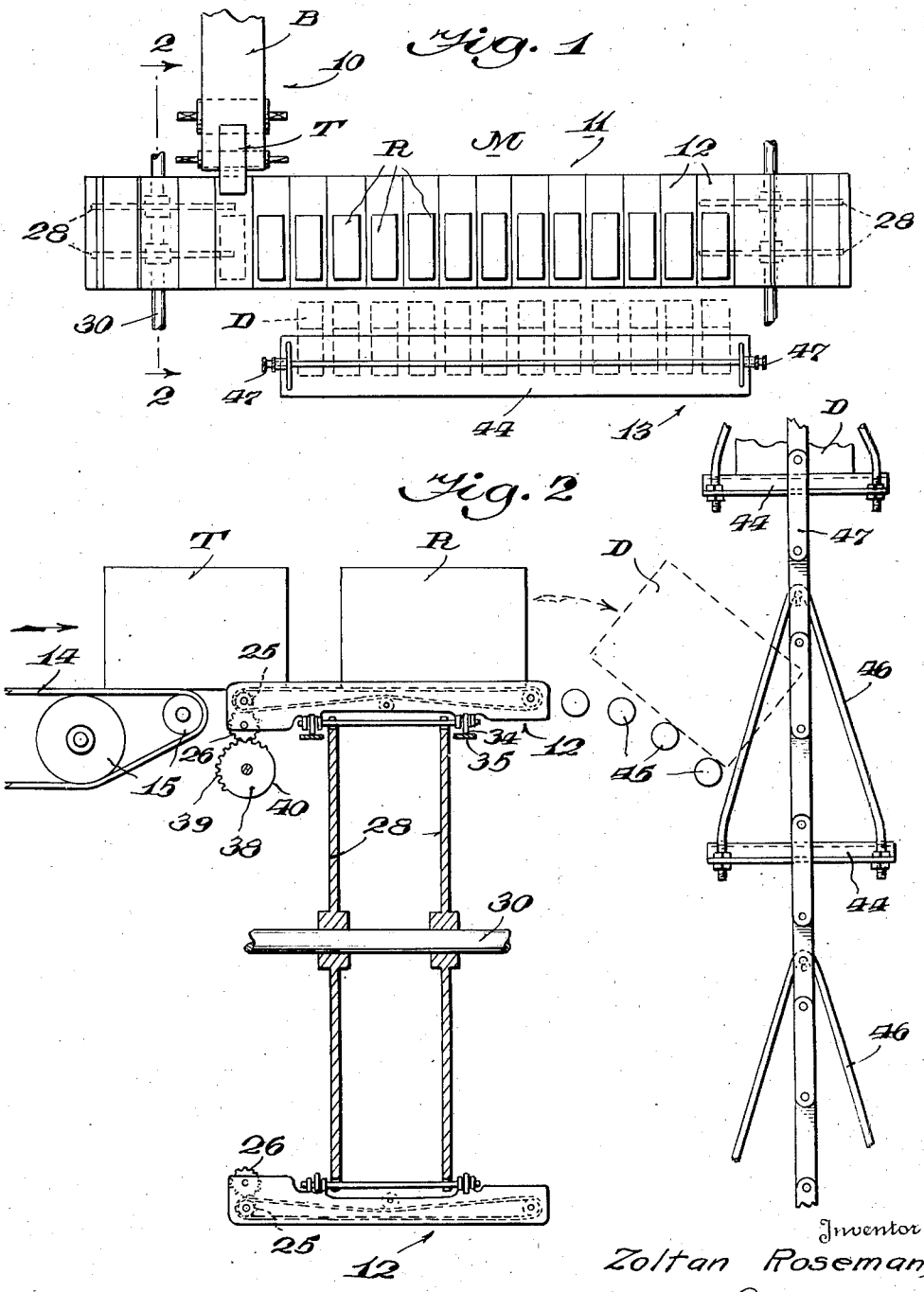

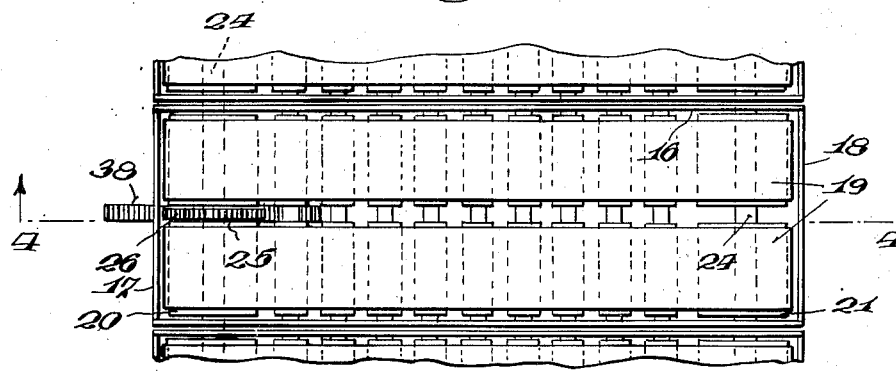
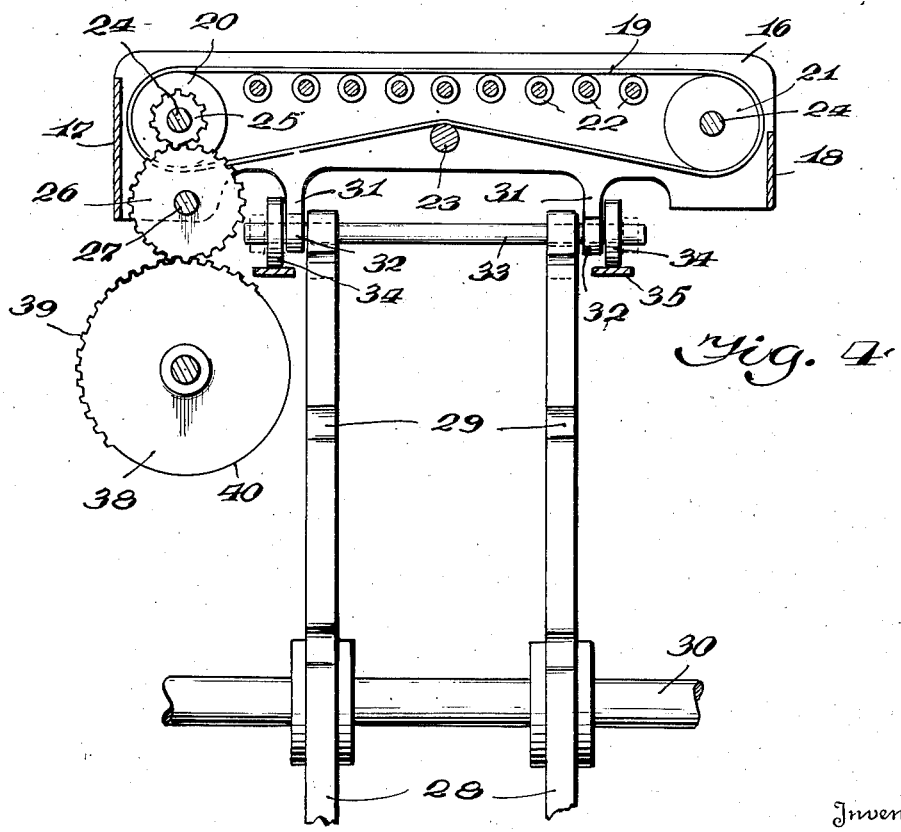

July 30, 1946.  Z. ROSEMAN  2,404,863
DISTRIBUTING CONVEYER
Filed Dec. 23, 1943  3 Sheets-Sheet 3

Inventor
Zoltan Roseman,
Attorneys

Patented July 30, 1946

2,404,863

UNITED STATES PATENT OFFICE 2,404,863

DISTRIBUTING CONVEYER

Zoltan Roseman, Cleveland, Ohio

Application December 23, 1943, Serial No. 515,434

13 Claims. (Cl. 198—31)

This invention relates to a distributing conveyer and pertains more particularly to an apparatus for distributing tile or blocks into rows preparatory to placing same upon the conveyer of a continuous drier, but it is to be understood that the invention is not to be so limited and it will be readily apparent from the following description that such apparatus may be advantageously adapted for arranging numerous other articles.

The primary object of this invention is to provide an apparatus of the above character, such as will receive a moving line of articles arranged in a single row and then automatically rearranged into a plurality of rows preparatory to any one of a number of subsequent operations to be performed on the articles.

A further and important object of the invention is to provide a distributing conveyer for use in the manufacture of tile, brick or like argillaceous plastic articles wherein after the initial formation of such articles they are fed by an endless conveyer in spaced end-to-end relation for delivery onto a second conveyer and rearranged in side-by-side relationship, with a predetermined number of a row of such articles simultaneously discharged from the second conveyer onto a third conveyer for subsequent treatment of the articles.

With the above and other objects in view that will become apparent as the nature of the invention is better understood, the same consists in the novel form, combination and arrangement of parts hereinafter more fully described, shown in the accompanying drawings and claimed.

In the accompanying drawings:

Figure 1 is a top plan view of a distributing conveyer constructed in accordance with the present invention, showing articles being delivered in end-to-end relationship by one conveyer onto a second conveyer and then rearranged thereon in side-by-side relationship, the articles on the second conveyer being illustrated by dotted lines after being deposited upon a third conveyer, Figure 2 is a vertical cross-sectional view taken on line 2—2 of Figure 1, with the articles shown by dotted lines as being delivered from the second to the third conveyer, Figure 3 is a fragmentary top plan view of the second or intermediate conveyer showing such conveyer formed of transversely moving conveyer elements, Figure 4 is a vertical cross-sectional view taken on line 4—4 of Figure 3, and Figure 5 is a fragmentary side elevational view of the intermediate conveyer.

While the invention disclosed herein may well be adapted for use in various arts involving conveyer mechanisms for the distribution or transfer of articles during the period of distribution or transfer, the invention will, for purposes of clarity, be described as a distributing conveyer for use in the tile making art and especially in the handling of the tile after the initial molding thereof for delivery to a drying apparatus. As shown in Figure 1, the endless conveyer 10 has tiles T placed thereon in end-to-end relation and spaced from each other for delivering the tiles onto the upper run of an endless conveyer designated in general by the reference character 11 that traverses the discharge end of the conveyer 10. The conveyer 11 is formed of a continuous series of transversely moving conveyer elements designated in general by the reference character 12 capable of independent and simultaneous operation for the delivery of the rearranged tiles T on the conveyer 11 onto the pallet of a drier conveyer designated in general by the reference character 13.

The endless conveyer 10 may comprise an endless belt 14 guided over drive rollers 15 as shown in Figure 2 for delivering a tile T therefrom onto the adjacent conveyer element 12.

The conveyer 11, as shown in Figures 3 to 5, may have each conveyer element 12 thereof comprise a rectangular frame having side walls 16 and end walls 17 and 18, the end walls 17 terminating at their upper ends slightly below the upper edges of the side walls 16 while the end walls 18 at the discharge side of the conveyer elements 12 terminate a greater distance below the upper edges of the side walls 16 to provide clearance for the downwardly inclined delivery of the tiles T therefrom onto the pallets of the drier conveyer. Each conveyer element 12 preferably comprises a pair of endless belts 19 traveling over end guide rollers 20 and 21 with a row of supporting rollers 22 positioned beneath the upper runs of the endless belts 19 to provide a substantial support therefor when loaded with tile. The lower runs of the endless belts 19 travel over a slack take-up roller 23.

For purposes presently to appear, the shaft 24 supporting the belt guide roller 20 carries a pinion 25 that meshes with a gear wheel 26 journaled on a shaft 27 that is mounted in the side walls 16 of the rectangular frame of each conveyer element.

The supporting structure for the endless conveyer 11 comprises pairs of disk wheels 28 at each end of the endless conveyer 11, the disk wheels being preferably notched as at 29 and carried by shafts 30. As shown more clearly in Figure 4, each side wall 16 of the rectangular frame of a conveyer element 12 carries a pair of depending arms 31 with a bearing 32 at the end of each arm for mounting on a cross shaft 33, said shafts being received in the peripheral notches 29 in the disk wheels 28 for the support of the endless conveyer 11. To maintain the upper run of the endless belt in a truly horizontal position with tile supported thereon the opposite end of each shaft 33 outwardly of the bearings 32 carries a roller 34 that rides upon a guide track 35 as shown in Figures 4 and 5.

After the initial formation of the tile, the same is in a more or less soft and plastic state and the distribution thereof must be accomplished without handling the tile and maintaining the same out of contact with each other. The tile T is shown in Figure 1 as being delivered in end-to-end and spaced relation by the endless conveyer belt 14, and in Figure 2 the forward edge thereof is moved onto one of the transverse conveyer element belts 19. At this point of procedure, the pinion 36 upon the shaft 37 as shown in Figure 5 is suitably powered and the relatively large gear 38 shown in Figure 4 as having a toothed section 39 and a plain section 40 continuously rotating, has the toothed portion 39 thereof engaged by a superposed gear wheel 26 of a conveyer element 12 to effect operation of the transversely movable endless belt 19 for moving the tile T to the position shown at R in Figure 2 for alignment in a row on the endless conveyer 11 as shown in Figure 1, and when the tile assumes row position as indicated at R the conveyer element 12 of the conveyer 11 becomes inactive. This latter action results by reason of the fact that movement of the conveyer 11 has moved the gear 26, carried by the transverse conveyer element 12, out of meshing engagement with the teeth 39 of the continuously rotating gear 38. Driving devices associated with the shafts 30 of the endless conveyer 11 accomplish a step-by-step movement of said endless conveyer. The foregoing operation continues until the upper run of the endless conveyer 11 has received a predetermined number in a row of aligned tile as at R, whereupon those transversely moving conveyer elements 12 which are spaced from the receiving element 10 and gear 38 are operated for the simultaneous discharge from the conveyer element 11 of the row of tile R onto the pallets of the drier conveyer 13. While the operation of all the conveyers may be accomplished by means of electric switches, electronic devices or other mechanism, time-operated gear elements are disclosed and, as shown in Figure 5, a shaft 41 carries a plurality of gear wheels 42 into which the gears 26 of the several conveyer elements 12 move for meshing engagement and at the proper time the pinion 43 on the shaft 41 is powered for the operation of the gears 42 and in turn the gears 26 and pinions 25 to move the conveyer belts 19 of each conveyer belt 12 for discharging the row of tile R as shown by dotted lines at D in Figures 1 and 2 onto the pallets 44 of the drier conveyer. After this operation, continued movement of the conveyer 11 will move the gears 26, carried by the conveyer elements 12, out of meshing engagement with the gears 42 carried by the shaft 41, thus permitting the transverse conveyer elements 19 to assume an inactive position. As shown in Figure 2, the tile in the position D are gently moved over guide rollers 45 to be received on the pallets 44 and said pallets are pendulously suspended by the end frames 46 from an endless conveyer element 47. The tile are then carried by the pallets of the drier conveyer to drying apparatus.

From the above detailed description of the invention, it is believed that the construction and operation thereof will at once be apparent, it being noted that in the distribution of the tile, the conveyer mechanism handles the same in a manner to maintain the tile in spaced relation at all times which is highly essential during the initial formation of the tile to prevent marring or disruption of any faces thereof. The endless conveyers together with the transversely moving conveyer elements 12 of the conveyer 11 have the operation so timed that the conveyer 11 is at rest while a tile is being delivered onto one of the conveyer elements 12, the receiving conveyer element 12 being operated to position the tile in a row position and when this has been accomplished the endless conveyer 11 is operated to position the latter adjacent conveyer element 12 in position to receive a tile from the conveyer 10 and that all of the conveyer elements 12 are simultaneously operated after a complete row of tile has been received thereon.

While there is herein shown and described the preferred embodiment of the invention, it is nevertheless to be understood that minor changes may be made therein without departing from the spirit and scope of the invention as claimed.

What is claimed as new, is:

1. In distributing conveyer mechanism of the character described, means for feeding articles in spaced end-to-end relation, and means for receiving the articles in spaced side-to-side relation until a predetermined number of such articles have been deposited thereon, said second named means comprising a plurality of interconnected and independently movable sequentially operated conveyer elements for the row aligning of said articles thereon.

2. In a distributing conveyer mechanism of the character described, a conveyer for feeding tiles singly in spaced end-to-end relation, a second conveyer moving transversely of the end of the first conveyer for receiving the tiles in spaced side-to-side relation until a predetermined number of tiles have been deposited thereon, said second conveyer comprising an endless series of relatively narrow transversely movable conveyer elements constructed and arranged for the simultaneous lateral discharge of all of said predetermined number of tiles therefrom, and a third conveyer for receiving tiles from the second conveyer.

3. In distributing conveyer mechanism of the character described, a conveyer for feeding tiles singly in spaced end-to-end relation, a second conveyer moving transversely of the end of the first conveyer for receiving the tiles in spaced side-to-side relation until a predetermined number of tiles have been deposited thereon, said second conveyer comprising an endless series of relatively narrow transversely movable conveyer elements constructed and arranged for the simultaneous lateral discharge of all of said predetermined number of tiles therefrom, a pallet conveyer for receiving tiles from the second conveyer, and relatively timed mechanism for the operation of the three conveyers.

4. In distributing conveyer mechanism of the character described, a conveyer for feeding tiles singly in spaced end-to-end relation, a second conveyer moving transversely of the end of the first conveyer for receiving the tiles in spaced side-to-side relation until a predetermined number of tiles have been deposited thereon, said second conveyer comprising a series of relatively narrow transversely movable conveyer elements capable of individual and simultaneous operation constructed and arranged for lateral discharge of all tiles therefrom, and a third conveyer for receiving tiles from the second conveyer.

5. In distributing conveyer mechanism of the character described, a conveyer for feeding tiles singly in spaced end-to-end relation, a second conveyer moving transversely of the end of the first conveyer for receiving the tiles in spaced side-to-side relation until a predetermined number of tiles have been deposited thereon, said second conveyer comprising a series of relatively narrow transversely movable conveyer elements capable of individual and simultaneous operation constructed and arranged for lateral discharge of all tiles therefrom, a pallet conveyer for receiving tiles from the second conveyer, and relatively timed mechanism for the operation of the three conveyers.

6. In distributing conveyer mechanism of the character described, a conveyer for feeding tiles singly in spaced end-to-end relation, a second conveyer moving transversely of the end of the first conveyer for receiving the tiles in spaced side-to-side relation until a predetermined number of tiles have been deposited thereon, said second conveyer comprising a series of individually and simultaneously operated transversely movable conveyer elements, means for independently moving each of a predetermined number of said transverse conveyer elements as a tile is received on each thereof from the first conveyer for aligning a predetermined number of the tiles on the second conveyer, a pallet conveyer for receiving tiles from the second conveyer, and means for simultaneously moving said predetermined number of the transverse conveyer elements for the discharge of the tile onto the pallet conveyer.

7. In distributing conveyer mechanism of the character described, a conveyer for feeding tiles singly in spaced end-to-end relation, a second conveyer moving transversely of the end of the first conveyer for receiving the tiles in spaced side-to-side relation until a predetermined number of tiles have been deposited thereon, said second conveyer being endless and comprising an endless series of transversely movable conveyer elements, means for operating each of said transversely movable conveyer elements aligned with the first named conveyer for locating a tile delivered thereto into row position, a pallet conveyer for receiving tiles from the second conveyer, and subsequently operating means for moving a predetermined number of said series of transversely movable conveyer elements for delivering a row of re-arranged tiles to the pallet conveyer.

8. A distributing conveyer as set forth in claim 2, wherein track rollers depend from each conveyer element and tracks are provided over which the rollers move for maintaining a portion of the receiving means in a straight line.

9. In a distributing conveyer mechanism of the character described, a conveyer for feeding tiles singly in spaced end-to-end relation, a second conveyer moving transversely of the end of the first conveyer for receiving the tiles in spaced side-to-side relation until a predetermined number of tiles have been deposited thereon, said second conveyer comprising a plurality of interconnected transversely movable endless conveyer elements constructed and arranged for the simultaneous lateral discharge of all of said predetermined number of tiles therefrom, and a third conveyer for receiving tiles from the second conveyer.

10. In distributing conveyer mechanism of the character described, a conveyer for feeding tiles singly in spaced end-to-end relation, a second conveyer moving transversely of the end of the first conveyer for receiving the tiles in spaced side-to-side relation until a predetermined number of tiles have been deposited thereon, said second conveyer comprising a plurality of interconnected transversely movable endless conveyer elements capable of individual and simultaneous operation for the simultaneous lateral discharge of all of said predetermined number of tiles therefrom, and a third conveyer for receiving tiles from the second conveyer.

11. In distributing conveyer mechanism of the character described, a conveyer for feeding tiles singly in spaced end-to-end relation, a second conveyer moving transversely of the end of the first conveyer for receiving the tiles in spaced side-to-side relation until a predetermined number of tiles have been deposited thereon, said second conveyer comprising a plurality of interconnected transversely movable endless conveyer elements capable of individual and simultaneous operation for the simultaneous lateral discharge of all of said predetermined number of tiles therefrom, a pallet conveyer for receiving tiles from the second conveyer, and relatively timed mechanism for the operation of the three conveyers.

12. A distributing conveyer mechanism of the character described, including an endless conveyer for feeding articles in spaced end-to-end relation with respect to each other, a second endless conveyer adjacent to and mounted for movement at right angles with respect to the delivery end of the first named conveyer, and a plurality of endless conveyer elements carried by said second conveyer element for movement independent of and at right angles to the path of movement of said second conveyer.

13. A distributing conveyer mechanism of the character described, including an endless conveyer for feeding articles in spaced end-to-end relation with respect to each other, a second endless conveyer adjacent to and mounted for movement at right angles with respect to the delivery end of the first named conveyer, and an endless conveyer element carried by said second conveyer for movement independently of and at right angles to the path of movement of said second conveyer.

ZOLTAN ROSEMAN.